(12) United States Patent
Liu et al.

(10) Patent No.: US 11,699,011 B2
(45) Date of Patent: Jul. 11, 2023

(54) METHOD, COMPUTER READABLE MEDIUM AND SYSTEM FOR AUTOMATED DESIGN OF CONTROLLABLE OSCILLATOR

(71) Applicant: SigmaStar Technology Ltd., Fujian (CN)

(72) Inventors: Hsian-Feng Liu, Taichung (TW); Ming-Jei Liu, Taipei (TW); Chun-I Chiu, Taipei (TW); Wei-Chih Cheng, Taoyuan (TW)

(73) Assignee: SigmaStar Technology Ltd., Fujian (CN)

( * ) Notice: Subject to any disclaimer, the term of this patent is extended or adjusted under 35 U.S.C. 154(b) by 474 days.

(21) Appl. No.: 16/937,533

(22) Filed: Jul. 23, 2020

(65) Prior Publication Data

US 2021/0034803 A1 Feb. 4, 2021

(30) Foreign Application Priority Data

Jul. 29, 2019 (CN) .......................... 201910688827.9

(51) Int. Cl.
  *G06F 30/327* (2020.01)
  *G06F 30/3308* (2020.01)
  *G06F 119/20* (2020.01)

(52) U.S. Cl.
  CPC ........ *G06F 30/327* (2020.01); *G06F 30/3308* (2020.01); *G06F 2119/20* (2020.01)

(58) Field of Classification Search
  CPC .............................. G06F 30/37; G06F 30/327
  USPC ........................................................ 716/104
  See application file for complete search history.

(56) References Cited

U.S. PATENT DOCUMENTS

| 6,260,176 | B1 | 7/2001 | Chen |
| 7,304,544 | B2 | 12/2007 | Colleran |
| 7,969,250 | B2 | 6/2011 | Boerstler |
| 2006/0141963 | A1* | 6/2006 | Maxim ................. H03L 7/0891 455/192.1 |
| 2006/0145767 | A1* | 7/2006 | Vaananen ................. H03L 7/18 331/16 |
| 2006/0238266 | A1* | 10/2006 | Harjani ................ H03B 5/1293 331/167 |

(Continued)

OTHER PUBLICATIONS

Liu, the specification, including the claims, and drawings in the U.S. Appl. No. 16/937,617, filed Jul. 24, 2020.

*Primary Examiner* — Suchin Parihar
(74) *Attorney, Agent, or Firm* — Winston Hsu

(57) ABSTRACT

An method, a computer readable medium and a system for an automated design of a controllable oscillator are provided, wherein the method includes: receiving a set of input data through an automated design procedure, wherein the set of input data includes an initial circuit description file and a criteria file, and the initial circuit description file records initial values of parameters of one or more components within the controllable oscillator; performing simulation according to the set of input data through the automated design procedure to generate a simulation result; and selectively modifying at least one parameter within the parameters of the one or more components according to the simulation result through the automated design procedure. In addition, in the process of modifying the at least one parameter, connection relationships of all components within the controllable oscillator are unchanged.

27 Claims, 4 Drawing Sheets

(56) References Cited

U.S. PATENT DOCUMENTS

| | | | |
|---|---|---|---|
| 2008/0030282 A1* | 2/2008 | Maget | H03B 27/00 331/46 |
| 2009/0243676 A1* | 10/2009 | Feng | G01R 31/31727 327/157 |
| 2015/0070948 A1* | 3/2015 | Johnson | H02J 3/38 363/40 |
| 2016/0204738 A1* | 7/2016 | Taghivand | H03B 5/1262 331/117 FE |
| 2018/0097475 A1* | 4/2018 | Djahanshahi | H03B 5/12 |
| 2022/0109236 A1* | 4/2022 | Afzal | H03L 7/0802 |
| 2022/0116046 A1* | 4/2022 | Chen | H03L 7/0896 |

* cited by examiner

METHOD, COMPUTER READABLE MEDIUM AND SYSTEM FOR AUTOMATED DESIGN OF CONTROLLABLE OSCILLATOR

BACKGROUND OF THE INVENTION

1. Field of the Invention

The present invention is related to automated circuit design, and more particularly, a method, a computer readable medium and a system (e.g. an automatic design system) for an automated design of a controllable oscillator.

2. Description of the Prior Art

In a phase-locked loop (PLL), performance of a voltage controlled oscillator (VCO) is critical. In order to optimize the performance of the VCO, a circuit design engineer typically needs to spend time on modifying parameters within the VCO, e.g. the number of stages of inverter used in the VCO. For a purpose of reducing the time for circuit design, the automated design becomes more likely to be applied in circuit design. Many automated design methods of the related art is hard to be realized, however. For example, variables are too many to converge for producing a clear result in practice. Thus, there is a need for a novel automated design method and an associated system, in order to reduce time for circuit design in practice.

SUMMARY OF THE INVENTION

An objective of the present invention is to provide a method (e.g. an automated design method), a computer readable medium and a system (e.g. an automated design system) for an automated design of a controllable oscillator, in order to save time for circuit design without introducing any side effect or in a way that is less likely to introduce side effects.

At least one embodiment of the present invention provides a method for an automated design of a controllable oscillator. The method comprises: receiving a set of input data through an automated design procedure, wherein the set of input data comprises an initial circuit description file and a criteria file, and the initial circuit description file records initial values of parameters of one or more components within the controllable oscillator; performing simulation according to the set of input data through the automated design procedure to generate a simulation result; and in response to the simulation result not reaching a predetermined specification described by the criteria file, iteratively modifying at least one parameter within the parameters of the one or more components according to the criteria file through the automated design procedure to generate an updated circuit description file, and performing simulation according to the updated circuit description file to re-generate the simulation result, until the simulation result reaches the predetermined specification. In addition, in the process of iteratively modifying the at least one parameter, connection relationships of all components within the controllable oscillator are unchanged.

At least one embodiment of the present invention provides an automated design system for a controllable oscillator, wherein the automated design system comprises a storage device and a processing circuit coupled to the storage device. The storage device may be configured to store a set of input data and a program code corresponding to an automated design procedure, wherein the set of input data comprises an initial circuit description file and a criteria file, and the initial circuit description file records initial values of parameters of one or more components within the controllable oscillator. In addition, the processing circuit may be configured to execute the program code to control the automatic design system to perform the automated design procedure. In the automated design procedure, the automated design system performs simulation according to the set of input data to generate a simulation result; and in response to the simulation result not reaching a predetermined specification described by the criteria file, the automated design system iteratively modifies at least one parameter within the parameters of the one or more components according to the criteria file to generate an updated circuit description file, and performs simulation according to the updated circuit description file to re-generate the simulation result, until the simulation result reaches the predetermined specification. In addition, in the process of iteratively modifying the at least one parameter, connection relationships of all components within the controllable oscillator are unchanged.

At least one embodiment of the present invention provides a method for an automated design of a controllable oscillator. The method comprises: receiving a set of input data through an automated design procedure, wherein the set of input data comprises an initial circuit description file and a criteria file, and the initial circuit description file records initial values of parameters of one or more components within the controllable oscillator; performing simulation according to the set of input data through the automated design procedure to generate a simulation result; and selectively modifying at least one parameter within the parameters of the one or more components according to the simulation result through the automated design procedure. In addition, in the automated design procedure for the controllable oscillator, circuit architecture of the controllable oscillator is unchanged.

At least one embodiment of the present invention provides a computer readable medium for an automated design of a controllable oscillator, wherein the computer readable medium stores a program code corresponding to an automated design procedure, and the program code is capable of being loaded into a computer in order to execute the following operations: receiving a set of input data, wherein the set of input data comprises an initial circuit description file and a criteria file, and the initial circuit description file records initial values of parameters of one or more components within the controllable oscillator; performing simulation according to the set of input data to generate a simulation result; and in response to the simulation result not reaching a predetermined specification described by the criteria file, iteratively modifying at least one parameter within the parameters of the one or more components according to the criteria file to generate an updated circuit description file, and performing simulation according to the updated circuit description file to re-generate the simulation result, until the simulation result reaches the predetermined specification. In addition, in the process of iteratively modifying the at least one parameter, connection relationships of all components within the controllable oscillator are unchanged.

The method, the computer readable medium storing the program code, and the automated design system provided by embodiments of the present invention can perform iterative modification and simulation verification regarding an oscillator with fixed architecture (e.g. connection relationships of components within the oscillator are unchanged), to find at least one set of parameters of the components, making the oscillator conform to predetermined requirement or specification.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
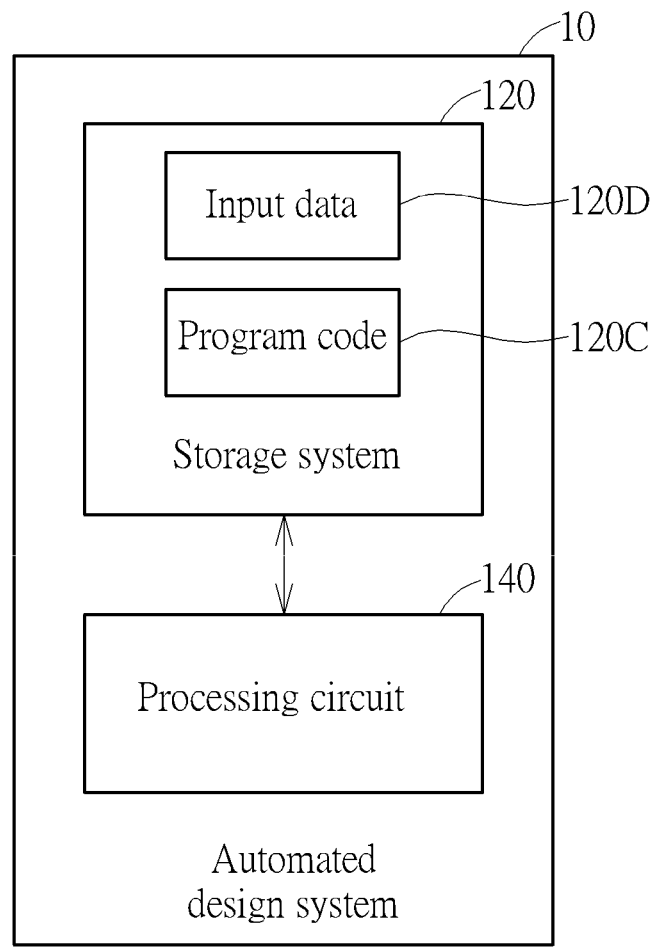
FIG. 1 is a diagram illustrating an automated design system according to an embodiment of the present invention.

FIG. 1 is a diagram illustrating an automated design system 10 according to an embodiment of the present invention. The automated design system 10 may comprise a storage device such as a storage system 120 and a processing circuit 140 coupled to the storage system 120. In this embodiment, the storage system 120 may be configured to store a set of input data 120D and an automated design computer program product such as a program code 120C corresponding to an automated design procedure, and the processing circuit 140 may be configured to execute the program code 120C to control the automated design system 10 to perform the automated design procedure to perform an automated design of a controllable oscillator, wherein examples of the automated design system 10 may include, but are not limited to: a personal computer, a server or any type of computer equipment, and examples of the controllable oscillator may include, but are not limited to: a voltage controlled oscillator (VCO), a current controlled oscillator or any type of oscillator. In addition, a storage system 120 may be a volatile memory or a non-volatile memory.

Figure 2:
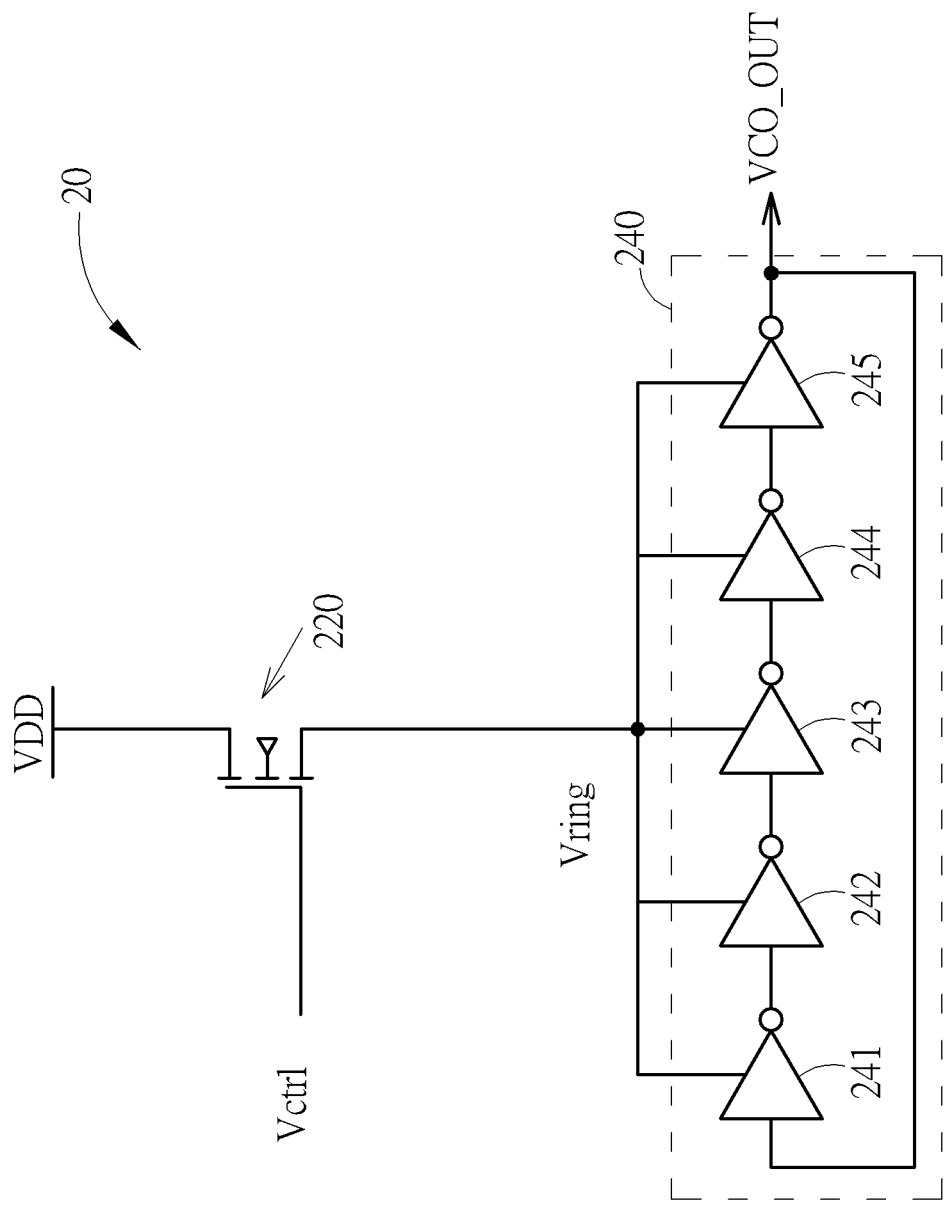
FIG. 2 is a diagram illustrating a voltage controlled oscillator according to an embodiment of the present invention.

FIG. 2 is a diagram illustrating a VCO 20 according to an embodiment of the present invention. The VCO 20 may comprise a voltage controlled current source (e.g. a transistor 220) and a buffer circuit 240 coupled to the voltage controlled current source. In this embodiment, the buffer circuit 240 may comprise a buffer chain circuit formed by a plurality of buffer units connected in series, e.g. a ring chain circuit formed by five inverters {241, 242, 243, 244, 245} connected in series, where the inverters {241, 242, 243, 244, 245} are coupled to the transistor 220 via a node Vring, but the present invention is not limited thereto. In addition, as shown in FIG. 2, the transistor 220 is further coupled to a supply voltage terminal VDD and a control terminal Vctrl, and an output terminal of the inverter 245 is coupled to an output terminal VCO OUT of the VCO 20; thus, the VCO 20 may output a periodic signal having a corresponding oscillation frequency from the output terminal VCO OUT according to a voltage level on the control terminal Vctrl.

Figure 3:
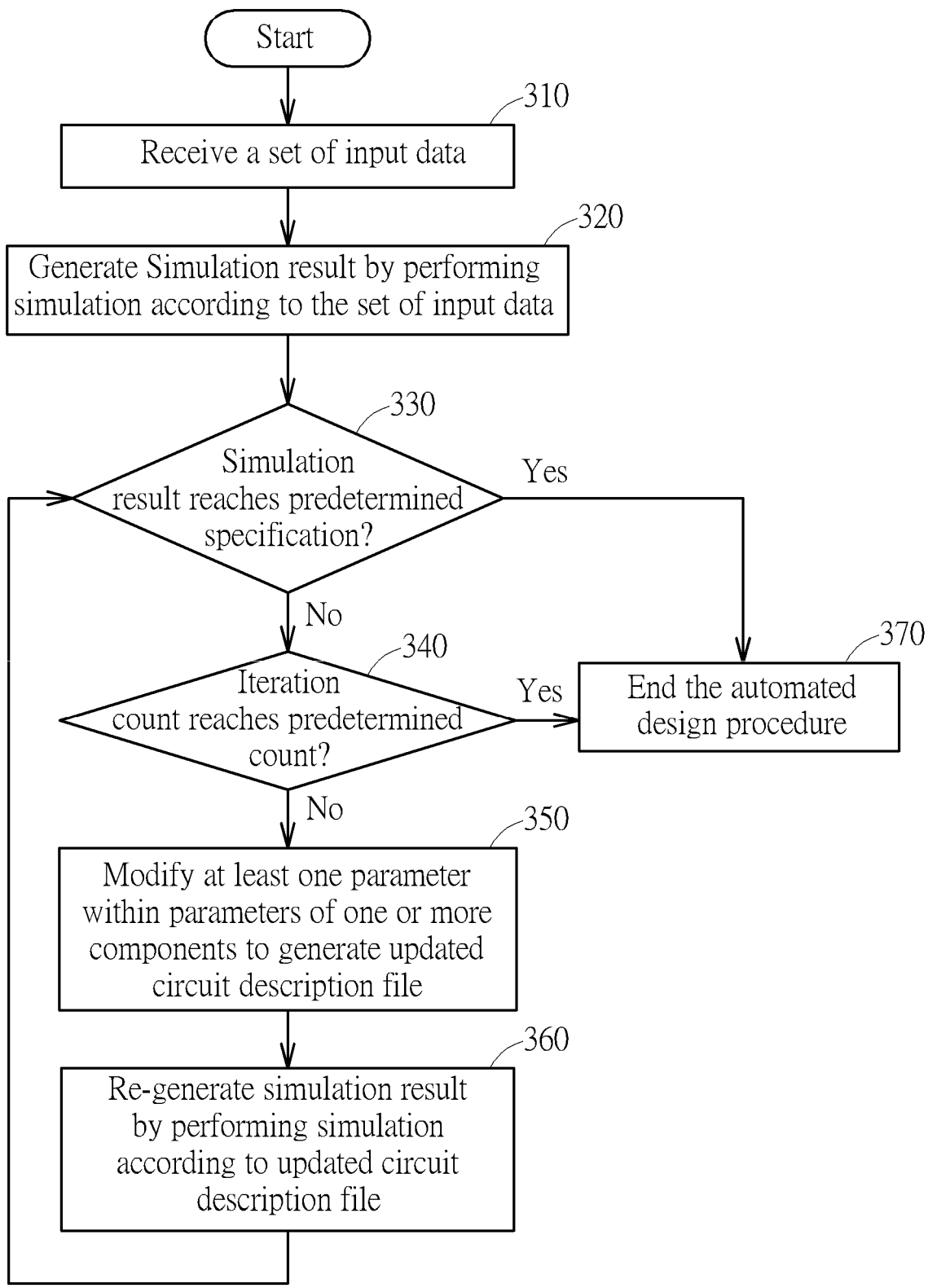
FIG. 3 is a working flow of a method for an automated design of a controllable oscillator according to an embodiment of the present invention.

FIG. 3 is a working flow (e.g. an automated design procedure) of a method (e.g. an automated design method) for an automated design of a controllable oscillator (e.g. the VCO 20 shown in FIG. 2) according to an embodiment of the present invention. It should be noted that the working flow shown in FIG. 3 is for illustrative purposes only, and is not a limitation of the present invention, where one or more steps may be added, deleted or modified in the working flow. In addition, if a same result may be obtained, these steps do not have to be executed in the exact order shown in FIG. 3.

In Step 310, the automated design system 10 may receive a set of input data (e.g. the input data 120D), and store the set of input data in the storage system 120. In this embodiment, the input data 120D may comprise an initial circuit description file and a criteria file, where the initial description file records initial values of parameters of one or more components within the VCO 20, e.g. an initial size of the transistor 220, initial sizes of transistors within the inverters {241, 242, 243, 244, 245}, and/or a voltage level of at least one node (e.g. the node Vring) within the VCO 20 under a condition of the initial sizes of the aforementioned transistors.

In Step 320, the automated design system 10 may generate a simulation result (e.g. a tuning range of an oscillation frequency of the VCO 20, phase noise of the VCO 20, or power consumption of the VCO 20) by performing simulation according to the set of input data (e.g. the input data 120D such as the initial circuit description file).

In Step 330, the automated design system 10 may determine whether the simulation result reaches a predetermined specification described by the criteria file, e.g. whether the tuning range conforms to a predetermined range value, whether the phase noise is less than a predetermined noise value, whether the power consumption is less than a predetermined power consumption value, and/or whether the voltage level on the node Vring exceeds an allowable voltage range (e.g. whether the voltage level on the node Vring is greater than an upper bound thereof, where the upper bound may be defined based on an allowable highest voltage for the transistors within the inverters {241, 242, 243, 244, 245}). If the simulation result reaches the predetermined specification (e.g. the tuning range conforms to the predetermined range value, the phase noise is less than the predetermined noise value, the power consumption is less than the predetermined power consumption value, and/or the voltage level on the node Vring does not exceed the allowable voltage range), the automated design procedure enters Step 370 and ends; if the simulation result does not reach the predetermined specification (e.g. the tuning range does not conform to the predetermined range value, the phase noise is greater than the predetermined noise value, the power consumption is greater than the predetermined power consumption value, and/or the voltage level on the node Vring exceeds the allowable voltage range), the automated design procedure enters Step 340.

In Step 340, the automated design system 10 may determine whether an iteration count within the automated design procedure reaches a predetermined count. If yes, the automated design procedure enters Step 370 and ends; otherwise, the automated design procedure enters Step 350.

In Step 350, in response to the simulation result not reaching the predetermined specification described by the criteria file, the automated design system 10 may modify at least one parameter within the parameters of the one or more components according to the criteria file to generate an updated circuit description file. For example, the automated design system 10 may modify sizes of one or more transistors within the VCO 20 (e.g. increase/reduce the size of the transistor 220, and/or increase/reduce the sizes of the transistors within the inverters {241, 242, 243, 244, 245}) according to the criteria file.

In Step 360, the automated design system 10 may re-generate the simulation result by performing simulation according to the updated circuit description file, and return to Step 330 to determine whether the simulation result reaches the predetermined specification after modifying the parameters within the VCO 20.

In Step 370, the automated design system 10 may end the automated design procedure. For example, when the automated design procedure enters Step 370 from Step 330, it means the automated design system 10 has made the parameters converge to a set of sizes that is applicable to the transistors within the VCO 20 to reach the predetermined specification; in another example, when the automated design procedure enters Step 370 from Step 340, it means that, before reaching the predetermined count of iterations, the automated design system 10 cannot make the parameters converge to a set of sizes that is applicable to the transistors within the VCO 20 to reach the predetermined specification.

In this embodiment, the criteria file may record one or more limitation conditions of modifying the at least one parameter, and the one or more limitation conditions may comprise a parameter range of the at least one parameter. More particularly, the parameter range of the at least one parameter may comprise a size range of at least one transistor within the VCO 20. For example, the criteria file may record size ranges of respective transistors within the VCO 20, respectively, to prevent the sizes of transistors from converging to sizes that are hard to be implemented and thus introduce additional costs during iterative modification; in another example, the criteria file may record a transistor size range to make transistor sizes of all transistors within the VCO 20 be limited within the transistor size range; but the present invention is not limited thereto.

In some embodiments, the automated design system 10 may directly take parameters (e.g. the sizes of transistors within the VOC 20) that are currently utilized for simulation as final parameters of the VCO 20 in response to the aforementioned condition where the iteration count reaches the predetermined count, but the present invention is not limited thereto. In some embodiments, the automated design system 10 may adaptively modify the one or more limitation conditions within the criteria file in response to the aforementioned condition where the iteration count reaches the predetermined count, and redo the automated design procedure, but the present invention is not limited thereto. In addition, the automated design system 10 may apply modification regarding any inverter within the buffer circuit 240 to other inverters within the buffer circuit 240, concurrently, in order to guarantee the inverters {241, 242, 243, 244, 245} remain identical to one another during the modification.

In addition, the criteria file may record a modification mechanism to allow the automated design system 10 to be able to modify different transistors in response to different simulation results, or perform different modification on a certain transistor in response to different simulation results. Since those skilled in the art of customized design of a controllable oscillator can understand related details of how to establish the modification mechanism in the criteria file, further description is therefore omitted for brevity.

Through the automated design procedure shown in FIG. 3, in response to the simulation result not reaching the predetermined specification described by the criteria file, the automated design system 10 can iteratively modify at least one parameter within the parameter of the one or more components according to the criteria file to generate the updated circuit description file, and re-generate the simulation result by performing simulation according to the updated circuit description file, until the simulation result reaches the predetermined specification (or until the iteration count reaches the predetermined count). According to embodiments of the present invention, the automated design system 10 may determine whether to redo the iterative modification and simulation according to a current accumulated iteration count, where if the current accumulated iteration count has exceeded the predetermined count, the automated design system 10 may end the automated design procedure to avoid wasting additional time cost. It should be noted that, in the process of modifying the at least one parameter, connection relationships of all components within the VCO 20 are unchanged. That is, the automated design method of the present invention is performed under a condition where the circuit architecture is fixed (e.g. the number of stages of inverters is fixed). As a result, unnecessary variables can be reduced, which makes the automated circuit design of the VCO 20 be able to be implemented easily, and reduces time for overall automated design procedure. In some embodiments, a voltage level of the control terminal Vctrl and/or a voltage level of the supply voltage terminal may be fixed at specific levels or limited within specific ranges, but the present invention is not limited thereto.

Note that, if the simulation result obtained from the first time simulation based on the set of input data (e.g. the input data 120D) is able to reach the predetermined specification, the automated design procedure may directly enter Step 370 without executing the process of subsequent iterative modification. If the simulation result obtained from the first time simulation based on the set of input data (e.g. the input data 120D) is not able to reach the predetermined specification, the automated design procedure may need to execute the process of subsequent iterative modification. Under the condition where circuit architecture (e.g. the circuit architecture of the controllable oscillator) to be processed by the automated design procedure is fixed, the automated design procedure may selectively modify at least one parameter within the parameters of the one or more components according to the simulation result.

Figure 4:
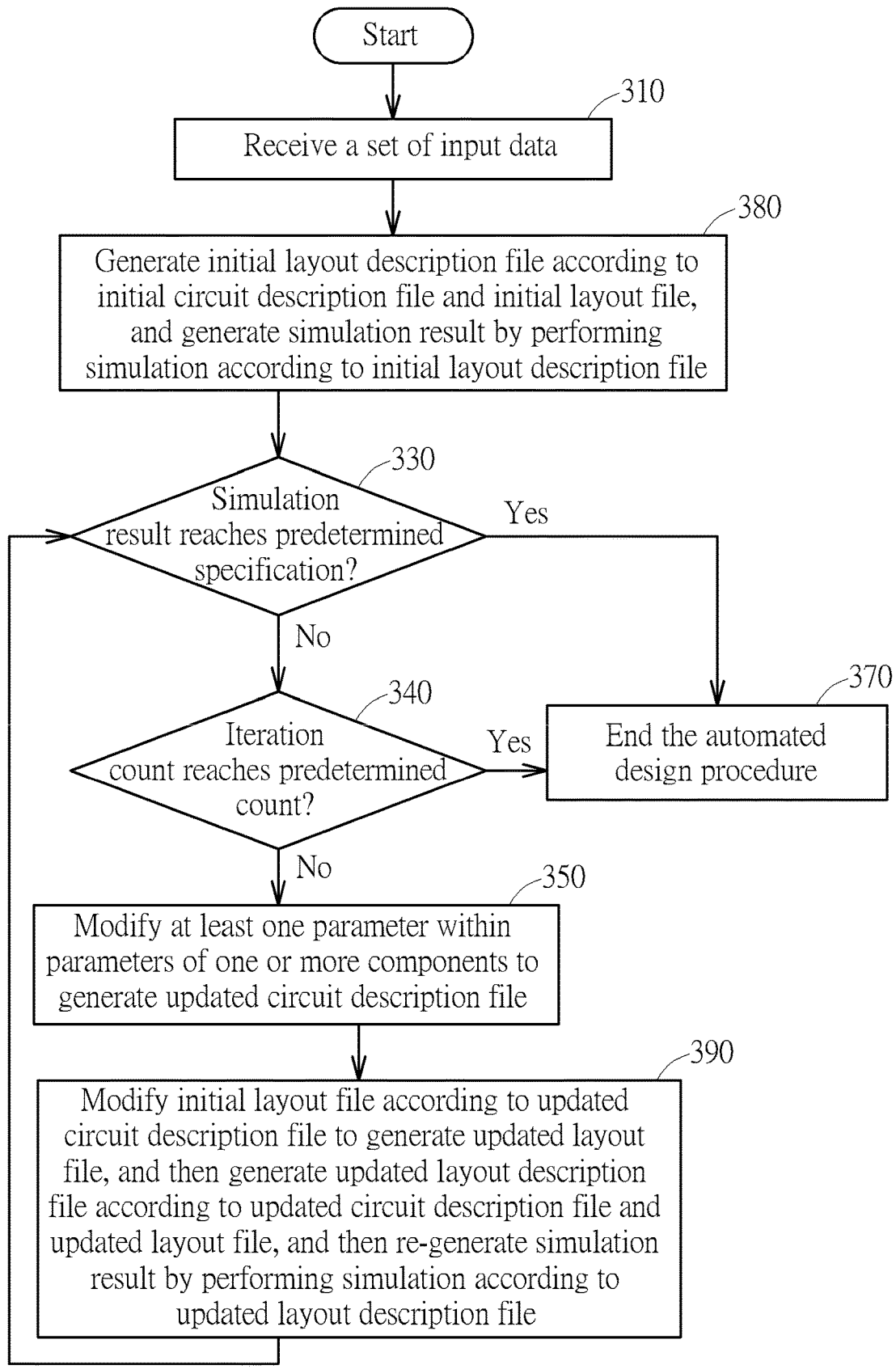
FIG. 4 is a working flow of a method for an automated design of a controllable oscillator according to another embodiment of the present invention.

In addition, the automated design procedure can consider non-ideal effects (e.g. additional parasitic capacitors or parasitic resistors, or circuit layout mismatch) of the VCO 20 in a physical chip through modifying the working flow shown in FIG. 3 (e.g. modifying the program code 120C), as shown in FIG. 4. In the embodiment shown in FIG. 4, the set of input data may further comprise an initial layout file. The working flow shown in FIG. 4 may be obtained by modifying the working flow shown in FIG. 3, where Step 320 may be replaced with Step 380, and Step 360 may be replaced with Step 390. In Step 380, the automated design system 10 may generate an initial layout description file according to the initial circuit description file and the initial layout file, and generate the simulation result by performing simulation according to the initial layout description file. As the initial layout description file records non-ideal effects generated by the layout manner corresponding to the initial layout file, these non-ideal effects can be considered during simulation. In Step 390, the automated design system 10 may modify the initial layout file according to the updated circuit description file to generate an updated layout file, and then generate an updated layout description file according to the updated circuit description file and the updated layout file, and then re-generate the simulation result by performing simulation according to the updated layout description file. As the updated layout description file records non-ideal effects generated by the layout manner corresponding to the updated layout file, these non-ideal effects can be considered during simulation.

To summarize, the automated design method and the automated design system of the present invention can perform iterative modification (e.g. modification of transistor sizes) and simulation regarding a controllable oscillator with fixed architecture, to allow the automated design system to make the simulation converge to at least one set of parameters (e.g. the transistor sizes) under a condition where the number of variables is properly controlled, in order to make the controllable oscillator be able to meet a target specification. More particularly, after the automated design system 10 receives input data (e.g. the aforementioned initial circuit description file, initial layout file and/or criteria file), the automated design method of the present invention can be automatically executed by the automated design system 10, rather than performing parameter modification through additional human work. The whole automated design procedure does not need users to get involved. Thus, the present invention can reduce time for designing a controllable oscillator without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for an automated design of a controllable oscillator, comprising:
   receiving a set of input data through an automated design procedure, wherein the set of input data comprises an initial circuit description file and a criteria file, and the initial circuit description file records initial values of parameters of one or more components within the controllable oscillator;
   generating a simulation result by performing simulation according to the set of input data through the automated design procedure; and
   in response to the simulation result not reaching a predetermined specification described by the criteria file, iteratively modifying at least one parameter within the parameters of the one or more components according to the criteria file through the automated design procedure to generate an updated circuit description file, and performing simulation according to the updated circuit description file to re-generate the simulation result, until the simulation result reaches the predetermined specification;
   wherein in a process of iteratively modifying the at least one parameter, connection relationships of all components within the controllable oscillator are unchanged.

2. The method of claim 1, wherein the criteria file records one or more limitation conditions of the at least one parameter, and the one or more limitation conditions comprise a parameter range of the at least one parameter.

3. The method of claim 2, wherein the parameter range of the at least one parameter comprises a size range of at least one transistor within the controllable oscillator.

4. The method of claim 3, wherein the controllable oscillator is a voltage controlled oscillator, the voltage controlled oscillator comprises a voltage controlled current source and a buffer circuit coupled to the voltage controlled current source, the buffer circuit comprises a buffer chain circuit formed by a plurality of buffer units connected in series, and at least one of the voltage controlled current source and the plurality of buffer units comprises the at least one transistor.

5. The method of claim 1, wherein the predetermined specification comprises whether a tuning range of an oscillation frequency of the controllable oscillator conforms to a predetermined range value, whether phase noise of the controllable oscillator is less than a predetermined noise value, or whether power consumption of the controllable oscillator is less than a predetermined power consumption value.

6. The method of claim 1, wherein the predetermined specification comprises a voltage range of at least one node within the controllable oscillator.

7. The method of claim 6, wherein the controllable oscillator is a voltage controlled oscillator, the voltage controlled oscillator comprises a voltage controlled current source and a buffer circuit coupled to the voltage controlled current source, the buffer circuit comprises a buffer chain circuit formed by a plurality of buffer units connected in series, the voltage controlled current source is coupled to the buffer circuit via the at least one node, and the voltage range comprises an upper bound of a voltage level of the at least one node.

8. The method of claim 1, wherein the set of input data further comprises an initial layout file corresponding to the initial circuit description file, and the step of generating the simulation result comprises:
   generating an initial layout description file according to the initial circuit description file and the initial layout file through the automated design procedure; and
   generating the simulation result by performing simulation according to the initial layout description file through the automated design procedure.

9. The method of claim 8, wherein the step of performing simulation according to the updated circuit description file to re-generate the simulation result comprises:
   modifying the initial layout file according to the updated circuit description file through the automated design procedure to generate an updated layout file;
   generating an updated layout description file according to the updated circuit description file and the updated layout file through the automated design procedure; and
   performing simulation according to the updated layout description file through the automated design procedure to re-generate the simulation result.

10. An automated design system for a controllable oscillator, comprising:
    a storage device, configured to store a set of input data and a program code corresponding to an automated design procedure, wherein the set of input data comprises an initial circuit description file and a criteria file, and the initial circuit description file records initial values of parameters of one or more components within the controllable oscillator; and a processing circuit, coupled to the storage device and configured to execute the program code to control the automatic design system to perform the automated design procedure, wherein:

the automated design system performs simulation according to the set of input data to generate a simulation result; and in response to the simulation result not reaching a predetermined specification described by the criteria file, the automated design system iteratively modifies at least one parameter within the parameters of the one or more components according to the criteria file to generate an updated circuit description file, and performs simulation according to the updated circuit description file to re-generate the simulation result, until the simulation result reaches the predetermined specification;

wherein in a process of iteratively modifying the at least one parameter, connection relationships of all components within the controllable oscillator are unchanged.

11. The automated design system of claim 10, wherein the criteria file records one or more limitation conditions of the at least one parameter, and the one or more limitation conditions comprise a parameter range of the at least one parameter.

12. The automated design system of claim 11, wherein the parameter range of the at least one parameter comprises a size range of at least one transistor within the controllable oscillator.

13. The automated design system of claim 12, wherein the controllable oscillator is a voltage controlled oscillator, the voltage controlled oscillator comprises a voltage controlled current source and a buffer circuit coupled to the voltage controlled current source, the buffer circuit comprises a buffer chain circuit formed by a plurality of buffer units connected in series, and at least one of the voltage controlled current source and the plurality of buffer units comprises the at least one transistor.

14. The automated design system of claim 10, wherein the predetermined specification comprises whether a tuning range of an oscillation frequency of the controllable oscillator conforms to a predetermined range value, whether phase noise of the controllable oscillator is less than a predetermined noise value, or whether power consumption of the controllable oscillator is less than a predetermined power consumption value.

15. The automated design system of claim 10, wherein the predetermined specification comprises a voltage range of at least one node within the controllable oscillator.

16. The automated design system of claim 15, wherein the controllable oscillator is a voltage controlled oscillator, the voltage controlled oscillator comprises a voltage controlled current source and a buffer circuit coupled to the voltage controlled current source, the buffer circuit comprises a buffer chain circuit formed by a plurality of buffer units connected in series, the voltage controlled current source is coupled to the buffer circuit via the at least one node, and the voltage range comprises an upper bound of a voltage level of the at least one node.

17. The automated design system of claim 10, wherein the set of input data further comprises an initial layout file corresponding to the initial circuit description file; the automated design system generates an initial layout description file according to the initial circuit description file and the initial layout file; and the automated design system performs simulation according to the initial layout description file to generate the simulation result.

18. The automated design system of claim 17, wherein the automated design system modifies the initial layout file according to the updated circuit description file to generate an updated layout file; the automated design system generates an updated layout description file according to the updated circuit description file and the updated layout file; and the automated design system performs simulation according to the updated layout description file to re-generate the simulation result.

19. A computer readable medium for an automated design of a controllable oscillator, wherein the computer readable medium stores a program code corresponding to an automated design procedure, and the program code is capable of being loaded into a computer in order to execute following operations:

receiving a set of input data, wherein the set of input data comprises an initial circuit description file and a criteria file, and the initial circuit description file records initial values of parameters of one or more components within the controllable oscillator;

generating a simulation result by performing simulation according to the set of input data; and in response to the simulation result not reaching a predetermined specification described by the criteria file, iteratively modifying at least one parameter within the parameters of the one or more components according to the criteria file to generate an updated circuit description file, and performing simulation according to the updated circuit description file to re-generate the simulation result, until the simulation result reaches the predetermined specification;

wherein in a process of iteratively modifying the at least one parameter, connection relationships of all components within the controllable oscillator are unchanged.

20. The computer readable medium of claim 19, wherein the criteria file records one or more limitation conditions of the at least one parameter, and the one or more limitation conditions comprise a parameter range of the at least one parameter.

21. The computer readable medium of claim 20, wherein the parameter range of the at least one parameter comprises a size range of at least one transistor within the controllable oscillator.

22. The computer readable medium of claim 21, wherein the controllable oscillator is a voltage controlled oscillator, the voltage controlled oscillator comprises a voltage controlled current source and a buffer circuit coupled to the voltage controlled current source, the buffer circuit comprises a buffer chain circuit formed by a plurality of buffer units connected in series, and at least one of the voltage controlled current source and the plurality of buffer units comprises the at least one transistor.

23. The computer readable medium of claim 19, wherein the predetermined specification comprises whether a tuning range of an oscillation frequency of the controllable oscillator conforms to a predetermined range value, whether phase noise of the controllable oscillator is less than a predetermined noise value, or whether power consumption of the controllable oscillator is less than a predetermined power consumption value.

24. The computer readable medium of claim 19, wherein the predetermined specification comprises a voltage range of at least one node within the controllable oscillator.

25. The computer readable medium of claim 24, wherein the controllable oscillator is a voltage controlled oscillator, the voltage controlled oscillator comprises a voltage controlled current source and a buffer circuit coupled to the voltage controlled current source, the buffer circuit comprises a buffer chain circuit formed by a plurality of buffer units connected in series, the voltage controlled current source is coupled to the buffer circuit via the at least one node, and the voltage range comprises an upper bound of a voltage level of the at least one node.

26. The computer readable medium of claim 19, wherein the set of input data further comprises an initial layout file corresponding to the initial circuit description file, and the operation of generating the simulation result comprises:
  generating an initial layout description file according to the initial circuit description file and the initial layout file through the automated design procedure; and
  performing simulation according to the initial layout description file through the automated design procedure to generate the simulation result.

27. The computer readable medium of claim 26, wherein the operation of performing simulation according to the updated circuit description file to re-generate the simulation result comprises:
  modifying the initial layout file according to the updated circuit description file through the automated design procedure to generate an updated layout file;
  generating an updated layout description file according to the updated circuit description file and the updated layout file through the automated design procedure; and
  performing simulation according to the updated layout description file through the automated design procedure to re-generate the simulation result.

* * * * *